April 23, 1929.  S. RUBEN  1,710,073
ELECTRICAL CONDENSER
Filed March 21, 1927
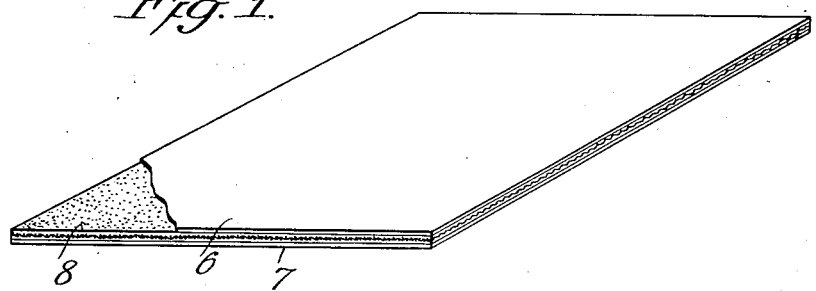
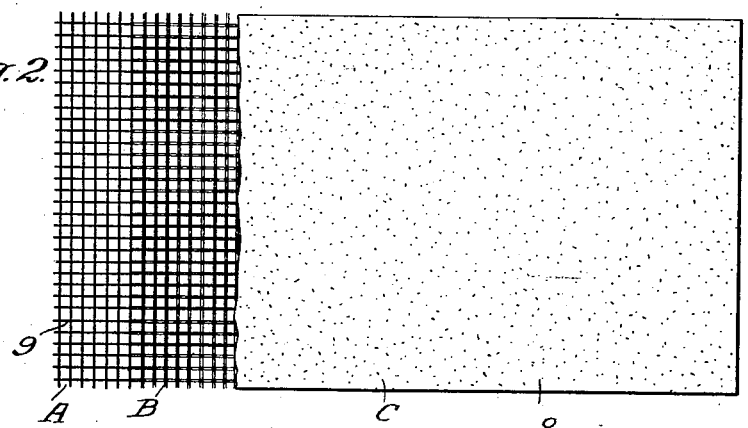
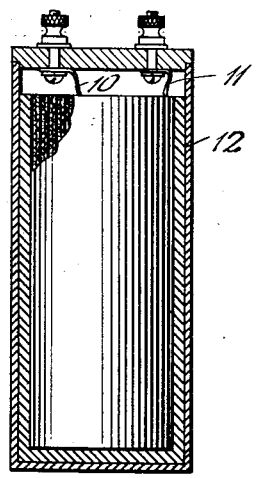
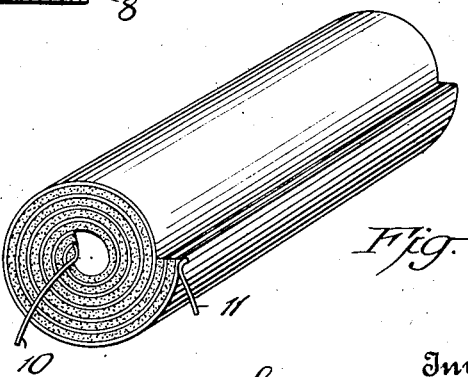
Inventor
Samuel Ruben
By his Attorney Patented Apr. 23, 1929.

1,710,073

UNITED STATES PATENT OFFICE.

SAMUEL RUBEN, OF NEW YORK, N. Y.

ELECTRICAL CONDENSER.

Application filed March 21, 1927. Serial No. 176,831.

This invention relates to electric condensers and has for an object the provision of a suitable spacer, for use particularly in separating the electrode plates of a condenser containing a fluid or semi-fluid dielectric or electrolyte medium, which will not react electrically with the electrode surfaces.

Another object is the provision of an electrical condenser having both a relatively high capacitance when used in alternating current circuits and a high direct current storage capacity which possesses long life with good operating characteristics over a wide range of atmospheric conditions.

Another object is the provision of an electrolyte composition for an electrolytic condenser which will possess long life and will automatically and quickly revive itself after any temporary removal of its water of solution.

Briefly these objects are accomplished by employing electrode plates at least one of which (preferably the anode) is a film-forming composition, separating said plates uniformly by a retiform or textural spacer which has been treated so that its individual fibres are coated with a non-conductive film, coating the spacer with an electrolyte in the form of a paste containing a film-forming electrolyte suspended or mixed with a stable hygroscopic material of preferably high viscosity, as glycerine, and applying a uniform pressure to the condenser plates or elements to insure continuous contact between the electrolyte and the electrodes or electrode coatings. With this construction, I have found that the condenser possesses a relatively high alternating current capacitance and a high direct current storage capacity, due to the low leakage obtained by the use of film-forming electrodes, and at the same time, the electrolyte does not become depleted as by evaporation, since the glycerine, being highly hygroscopic insures the maintenance of sufficient water in the electrolyte between the electrodes for satisfactory operation and since this electrolyte is in the form of a paste and contains normally a relatively small amount of water. By direct current storage capacity is meant the ability of the condenser to hold a charge. Furthermore, the undesirable electrolytic effects usually present upon the contact of a textile spacer and the electrode plates are substantially eliminated by the coating applied to the individual fibres of the spacer. Also, deformation of the electrode films when not in use, which is common in the usual type of liquid electrolyte, due to the films entering into solution with the electrolyte, is prevented or considerably reduced, since in a paste electrolyte, there is practically no mobile solution to accomplish this dissolving action of the films.

To these and other ends, the invention consists in further features all of which will be more fully described and thoroughly understood with the aid of the description to be given in connection with the accompanying drawings, the novel features being particularly set forth in the appended claims.

In the drawings:

Fig. 1 is a perspective view, partly broken away, of one embodiment of the invention showing a flat plate condenser.

Fig. 2 is a plan view partly broken away showing the spacer without any coating at A, impregnated with paraffin at B, and coated with paste at C.

Fig. 3 is an end cross-sectional view of a portion of the arrangement shown in Fig. 1.

Fig. 4 is a perspective view of a modification showing the arrangement of the invention in coiled form.

Fig. 5 is a vertical sectional view of the arrangement of Fig. 4 enclosed within a protective casing.

In the drawings, the same reference characters have been used to denote similar parts.

Electrical condensers may be generally classified as either electrostatic or electrolytic, each type having particular properties which make them especially adapted for use in specific instances. Electrolytic condensers are particularly qualified for use where a low leakage and high capacitance in direct current circuits and therefore a high direct current storage capacity is required. This type of condenser, however, possesses another inherent disadvantage to its universal application, namely evaporation of the electrolyte, requiring frequent renewals. In many instances, the requirements of the particular circuit include both adequate alternating current capacitance, as possessed generally by an electrostatic condenser, and high direct current storage capacity a product of high capacitance and low leakage, as in electrolytic condensers. An example of such a circuit is the filter circuit commonly employed for the elimination of batteries as the power supply source for radio circuits and it is to this end that I have constructed my condenser.

In the drawings I have shown several embodiments of a plate condenser constructed in accordance with my invention and comprising generally an electrolytic condenser having a pair of spaced film-forming electrode plates 6 and 7, positive and negative (anode and cathode) respectively, in which the electrolyte is supplied as a paste 8 formed by the suspension of the desired film-forming electrolyte in a relatively viscous, highly hygroscopic medium which preferably possesses a comparatively high dielectric constant, such a paste mixture being held in the desired form between the electrodes by applying it to a suitable retiform spacer element 9, as a wide mesh cloth disposed between the electrodes 6 and 7. With this arrangement of parts, a high direct current storage capacity is obtained while the inherent disadvantage of such condensers, evaporation of the electrolyte, is effectively overcome by the use of the highly hygroscopic medium which automatically maintains the water content of the electrolyte at the desired value by absorption of moisture from the air. Furthermore, the danger of complete loss of life of the electrolyte by extreme temperature or dryness is completely obviated, since a properly chosen hygroscopic medium can be relied upon to quickly restore the water content, even though temporarily allowing the condenser to cease functioning. Thus, I have produced a condenser which is adapted for use over a wide range of operating conditions and which possesses a substantially complete immunity from more than a very temporary loss of life due to evaporation. Alternating current capacitance is also supplied in this arrangement, since the electrolytic cell itself possesses a certain quantity of what may be termed electrostatic capacitance depending upon the concentration and character of the film-forming electrolyte and the thickness of the films on the electrodes and to this is added the capacitance resulting from the presence of the suspension medium disposed between the metallic electrode plates. In this manner, the safe alternating current capacitance of the usual electrolytic condenser is appreciably increased without danger of approaching the break down voltage value of the oxide films.

One of the requisites of a condenser of this type is its adaptability to a wide range of operating conditions and for this reason the arrangement of parts is preferably one which will not necessitate the exercise of more than usual care in the handling and use of the condenser. It is for this reason that I supply the electrolyte in the form of a paste, since the latter is inherently of a more stable and permanent nature than the usual liquid electrolyte. To the further obtainment of this same end, I employ a reticular spacer 9, as a wide mesh cloth, interposed between the electrodes 6 and 7 and serving as a foundation upon which the electrolyte paste 8 may be suitably coated. In this manner, the spacer 9 serves as a support for the semi-fluid or plastic electrolyte and holds it in the desired form between the electrodes particularly when pressure is applied to the plates 6 and 7. When such a spacer element is employed, however, I have found that an interaction occurs between the ends of the fibres in the spacer material and the surface of the electrodes, resulting in a carbonization of the spacer material and a consequent destruction of the oxide film on the electrodes and increased leakage.

I have found, however, in accordance with the invention, that the detrimental effects resulting from this interaction may be obviated by impregnating the spacer 9, before it has received the paste 8, with a suitable composition so that the individual fibres are each provided with a regular coating which is non-conductive and waterproof. Various materials may be employed for this purpose, but I have found paraffin, applied hot, to be particularly satisfactory. One explanation of this interaction might be to the effect that the individual fibres contain electrolytic material, either as sizing used in their manufacture or as actual electrolyte absorbed from the applied paste, and that sparking occurs between these poorly conducting fibres and the electrodes per se, thus preventing complete formation of the oxide film on the film-forming electrodes. Regardless of the explanation of the phenomenon, however, I have found that it is effectively prevented if the spacer fibres are provided with a non-conductive coating of a more or less permanent nature so that the fibres per se do not contact with the electrodes. This coating is preferably so applied that only the individual fibres are coated and not the entire surface of the spacer, so that the spacers between the fibres will be left free to receive a supply of electrolyte.

The size of spacer cloth employed will depend upon the particular condenser being produced, the mesh being sufficiently large to hold the desired quantity of paste and the thickness being sufficient to provide the desired strength. As a general rule, I have found the use of a spacer cloth having from 10-24 meshes per inch to be satisfactory. In any case, the textile used should preferably be soft and as free as possible from electrolytic sizing or bleaching materials which would be apt to affect the operating characteristics of the condenser by changing the characteristics of the electrolyte and causing interaction at the electrodes.

Glycerine has been found to be a particularly satisfactory material for use as a suspension medium for the film-forming electrolyte since it possesses in itself all the characteristics desired, being sufficiently viscuous to form a suitable paste with a film-forming electrolyte, having a relatively high dielectric constant value to thereby increase the alternating current capacitance of the condenser, and being highly hygroscopic so that loss of life due to evaporation of electrolyte is effectively overcome. In regard to the great extension of life obtained by the use of glycerine, I have found, for example, that condensers formed in accordance with my invention may be subjected to such high temperatures as to completely dehydrate the paste mixture, without completely destroying the condenser, the glycerine absorbing sufficient moisture within a few minutes to restore the operating characteristics of the condensers to substantially normal. Furthermore, the glycerine will absorb sufficient moisture under normal conditions of temperature and humidity to maintain the water content of the mixture at all times sufficient for efficient operation.

The proportion of glycerine employed will depend upon the particular film-forming electrolyte employed and upon the amount of water used to dissolve the electrolyte solutes, but as a general rule it may be said that it should be sufficient to form a rather thick paste with the electrolyte materials.

The particular film forming electrolyte employed may be any one of a large number of well known electrolytes, but I have found a mixture of boric acid and sodium borate to be especially satisfactory. As a general rule, it may be said that film-forming electrolytes should preferably be either neutral or slightly acid in character and for this reason it is customary to employ for this purpose water solutions of the salts of weak acids. Similarly mixtures of weak acids with salts of the above mentioned character are used to replace the latter in order to reduce the alkalinity of the solution and thereby more nearly approach neutrality. I use a mixture of boric acid and sodium borate dissolved in water since such a mixture may be readily proportioned so as to be substantially stable chemically and possess the desired conductivity values. Also, a concentrated solution of these compounds with water mixes readily with glycerine to form a glacial like paste which is especially easy to spread. In forming the paste, the electrolyte is first prepared preferably by dissolving the film-forming electrolyte materials in hot water and this solution is then thoroughly intermixed with glycerine to form a product of uniform composition.

The electrodes may be formed of any of a number of well-known film-forming compositions such as aluminum, magnesium and tantalum, but aluminum is best-suited for commercial purposes and I have therefore formed my electrode plates of thin aluminum sheets of surface sufficient to give the desired capacity. The choice of the electrode composition will also be governed somewhat by the particular circuit requirements for which the unit is designed for use, but for universal application, aluminum electrodes are preferable. For use with low voltage alternating current below the decomposition potential of the electrolyte with capacitance effects and no particular storage capacity requirements, lead for example, may be employed.

Before assembly in the condenser, the electrodes are preferably first cleansed and then if desired formed, that is the surfaces thereof coated with oxide films, so as to adapt the unit for immediate use at full capacity, without necessitating delay to allow for the films to be initially built up during operation. Soft aluminum sheets approximately 6 mils thick and commercially pure with a content of about 0.1% copper are preferably chosen and then cleaned by subjecting them to the following successive operations: (1) immersion in a 25% caustic potash solution at about 80° C. for sufficient time to permit surface reaction; (2) washing in hydrant water; (3) immersion in 70% nitric acid; (4) another washing in hydrant water; and (5) a final washing with distilled water. This cleansing treatment is provided so as to insure the removal of all impurities and foreign matter from the surfaces of the electrodes to enable complete formation of the film to take place. After this cleansing treatment the sheets are ready for the forming operation which may comprise for example, subjecting the aluminum sheet to the action, first at a comparatively low temperature and then at about 80° C., of a saturated solution of borax with 10% boric acid content while connected as the positive terminal in a direct current circuit supplying the film-forming current and at a voltage equal to or higher than the open circuit voltage at which they are to be employed. By first forming the electrodes in a cool solution, an initial film is more quickly formed and it will be strengthened by the action of the hot solution. The progress of the formation of the film may be noted by the readings of an ammeter supplied in the forming circuit, the current falling as the film is built up.

The preferred electrolyte composition is one in which the ratio of sodium borate to boric acid by weight is approximately 17 to 1 with the water content about 2 c. c. to each gram of boric acid. This solution is then added to and thoroughly mixed with glycerine whose content is preferably in the neighborhood of 2¾ times that of boric acid. These ratios and figures are of coarse only exemplary and the values used may depart materially from those given while remaining within the scope of the invention.

The electrolyte may be applied in the form of a paste to the spacer but I have found that considerably more satisfactory results are obtained if the glycerine-electrolyte mixture is heated and applied to the spacer in a fluid or semi-fluid condition and the coated spacer then subjected to the action of a vacuum to thoroughly impregnate it as described in my co-pending application Serial No. 207,853.

In the figures of the drawings, I have shown my invention as applied to a flat parallel plate condenser in Fig. 1 though the coiled form illustrated in Figs. 4 and 5 is the preferred form, since a more constant and uniformly distributed pressure may be easily maintained when the plates are coiled to round form, thus appreciably reducing the likelihood of occurrence of localization of pressure, producing leakage effects, between the plates. In forming a condenser in coiled form an additional paste coated spacer 9ª is provided on the outer surface of one of the electrode plates to thus keep the latter separated at all points.

Terminals 10 and 11 may be provided on one edge of the electrode plates and the entire unit assembled within a suitable enclosing casing 12 if desired, as shown in Fig. 5.

This application is a continuation in part of my copending application Serial No. 156,308, filed December 22nd, 1926.

What I claim is:—

1. In an electric condenser, the combination with positive and negative electrode members, formed of a film-forming material, of a fibrous spacer impregnated with paraffin positioned between the electrode members, and a comparatively viscous electrolyte disposed over the surface and in the interstices of the spacer.

2. In an electric condenser, the combination with spaced film forming electrode plates, of a conductive composition therebetween containing glycerine suspension medium and a film-forming electrolyte suspended therein, the proportions of suspension medium and electrolyte being such that a mixture of paste consistency is formed.

3. An electric condenser comprising a pair of separated film-forming electrodes of opposed polarity, a pair of waterproofed fibre spacers one located on each face of one of the electrodes, an electrolyte mixture suspended in glycerine, the entire unit being coiled to circular form after assembly.

4. In an electrolytic cell, the combination with a pair of opposed plates of opposite polarity and composed of similar film-forming compositions, of a flexible textural spacer impregnated to be water-proof and free from electrolysis between its fibres and the plates and interposed between the plates of the pair and a film-forming electrolyte in paste form and suspended within the meshes of said textural spacer, said electrolyte containing boric acid and sodium borate in suitable supersaturated plastic form such as to afford electrostatic capacitance to the cell in addition to that provided by the plate films.

5. In an electrolytic cell, the combination with separated electrode members, of a conductive material for disposition between the electrodes comprising an electrolyte in supersaturated form suspended in a medium combining viscosity, to afford a paste like mixture with said electrolyte, hygroscopicity to maintain the water content of the electrolyte substantially at its initial value and a relatively high dielectric constant to afford added electrostatic capacitance to the cell, said material being the sole vehicle for electrical conduction.

6. In an electric condenser, the combination with spaced film-forming electrode plates, of a conductive composition therebetween containing glycerine suspension medium and a film-forming supersaturated electrolyte suspended therein, the proportions of suspension medium and electrolyte being such that a mixture of paste consistency is formed, said glycerine affording hygroscopicity and a greater value of dielectric constant to the composition and said glycerine and said supersaturated electrolyte adding electrostatic capacitance to the condenser over that provided by the films formed on the electrode plates, said composition being the sole vehicle for electrical conduction.

7. In an electric condenser, the combination, with a pair of film-forming electrodes and a spacer there-between, of a conductive medium comprising a mixture of glycerine and a film-forming electrolyte composition of a supersaturated solution of boric acid and sodium borate, said glycerine affording hygroscopicity, viscosity and a greater value of dielectric constant to the conductive medium and said glycerine and said supersaturated solution adding electrostatic capacitance to the condenser over that of the films on the electrodes, said medium being the sole vehicle for electrical conduction.

8. A paste electrolyte for electric condensers comprising as sole vehicle for electrical conduction glycerine and a film-forming composition of boric acid and sodium borate in supersaturated plastic form, the proportions of the ingredients being such that their mixture possesses a comparatively high viscosity at ordinary temperatures, said glycerine affording hygroscopicity to maintain the water-content of the paste electrolyte substantially at its initial value and a greater value of dielectric constant to said electrolyte and said glycerine and said composition affording added electrostatic capacitance to the condensers.

9. In an electrolytic condenser, the combination with film-forming electrodes spaced apart and a viscid film-forming electrolyte between said electrodes, of a spacer medium, impregnated to prevent electrolytic interaction between its fibres, the electrolyte and the surface of the electrodes, said spacer being positioned between the electrodes and in substantial surface contact with the latter and serving as a medium for the suspension of the electrolyte in paste form.

SAMUEL RUBEN.